US008126996B2

(12) United States Patent
Shiraki

(10) Patent No.: US 8,126,996 B2
(45) Date of Patent: Feb. 28, 2012

(54) DATA PROVIDING SYSTEM AND COMMUNICATION APPARATUS

(75) Inventor: Tomomi Shiraki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 228 days.

(21) Appl. No.: 12/406,777

(22) Filed: Mar. 18, 2009

(65) Prior Publication Data

US 2009/0248791 A1 Oct. 1, 2009

(30) Foreign Application Priority Data

Mar. 31, 2008 (JP) .................................. 2008-089612

(51) Int. Cl.
*G06F 15/173* (2006.01)
*G06F 15/16* (2006.01)
(52) U.S. Cl. .......................... 709/223; 709/230; 709/245
(58) Field of Classification Search .................. 709/223, 709/230, 245
See application file for complete search history.

(56) References Cited

U.S. PATENT DOCUMENTS

2008/0140822 A1* 6/2008 Torii ............................ 709/223

FOREIGN PATENT DOCUMENTS

| JP | 2006-085643 A | 3/2006 |
| JP | 2007-257525 A | 10/2007 |
| JP | 2007-257527 A | 10/2007 |

* cited by examiner

*Primary Examiner* — David Lazaro
*Assistant Examiner* — Xiang Yu
(74) *Attorney, Agent, or Firm* — Baker Botts L.L.P.

(57) ABSTRACT

A data providing system includes a first communication apparatus and a plurality of second communication apparatuses that provide data to the first communication apparatus using a communication protocol capable of performing authentication by identification information. The first communication apparatus includes an identification information request sending section, an individual identification information receiving section, a first data request sending section, a first common identification information storage section, a second data request sending section, and a data receiving section. At least one of the second communication apparatuses includes an individual identification information storage section, a second common identification information storage section, an identification information request receiving section, an individual identification information sending section, a data request receiving section, a first data sending section and a second data sending section. The first data sending section sends first type data to the first communication apparatus when the identification information included in the received data request is the stored individual identification information. The second data sending section sends second type data to the first communication apparatus when the identification information included in the received data request is the stored common identification information.

10 Claims, 14 Drawing Sheets

FIG. 4

| | USER NAME | AUTHENTICATION KEY | ENCRYPTION KEY |
|---|---|---|---|
| 210 → | Administrator | AAA | BBB |
| 212 → | User | CCC | DDD |

| | View NAME | TARGET INFORMATION |
|---|---|---|
| 240 → | Management | ALL MANAGEMENT INFORMATION |
| 242 → | User | MINIMUM INFORMATION NECESSARY FOR USE OF PRINTER (ex. MODEL NAME, REMAINING AMOUNT OF CONSUMABLE GOODS OR STATUS) |
| 244 → | Discover | MINIMUM INFORMATION NECESSARY FOR SEARCH OF PRINTER (ex. MODEL TYPE, VENDOR NAME OR MODEL NAME) |

| | CONTEXT NAME | USER NAME | SECURITY LEVEL | View TYPE | View NAME |
|---|---|---|---|---|---|
| 270 → | Printer | Administrator | PRESENCE OF AUTHENTICATION, PRESENCE OF ENCRYPTION | READ | Management |
| 272 → | Printer | Administrator | PRESENCE OF AUTHENTICATION, PRESENCE OF ENCRYPTION | WRITE | Management |
| 274 → | Printer | User | PRESENCE OF AUTHENTICATION, ABSENCE OF ENCRYPTION | READ | User |
| 276 → | Discover | Administrator | PRESENCE OF AUTHENTICATION, ABSENCE OF ENCRYPTION | READ | Discover |
| 278 → | Discover | User | PRESENCE OF AUTHENTICATION, ABSENCE OF ENCRYPTION | READ | Discover |

260

280　282　284　286　288

DATA PROVIDING SYSTEM AND COMMUNICATION APPARATUS

CROSS-REFERENCE TO RELATED APPLICATION

This application claims priority from Japanese Patent Application No. 2008-089612, filed on Mar. 31, 2008, the entire subject matter of which is incorporated herein by reference.

TECHNICAL FIELD

Aspects of the present invention relate to a system and a communication apparatus for providing data from an agent device to a manager device.

BACKGROUND

A system for providing data for a manager device from an agent device using SNMPv3 (Simple Network Management Protocol version3) is known (for example, see the following Patent Reference 1). An engine ID unique to each of the agent devices is set under the SNMPv3. The manager device requests the engine ID from each of the agent devices. Each of the agent devices sends its own engine ID to the manager device by request. Then, the manager device sends a data request including the engine ID of its agent device to each of the agent devices. Each of the agent devices sends data (for example, a status or the remaining amount of consumable goods) had by its own agent device to the manager device on condition that the engine ID included in the data request matches with its own engine ID. The manager device can acquire data of each of the agent devices. In the SNMPv3, the engine ID set in the individual agent device can be used for authentication. As a result of this, security of data communication is high.

Patent Document 1: Japanese Patent Publication No. 2006-085643A

However, in this technique, it is necessary to make a response and a request of individual identification information before target data is communicated, and a communication load becomes large. Particularly, when a manager device acquires data had by each of the devices with respect to the agent devices, the communication load becomes larger as the number of agent devices is large.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an aspect of the present invention to provide a system and/or an apparatus which performs authentication by identification information and which is capable of reducing a communication load.

The above and other aspects of the present invention are accomplished by providing a data providing system comprising: a first communication apparatus; and a plurality of second communication apparatuses that provide data to the first communication apparatus using a communication protocol capable of performing authentication by identification information, wherein the first communication apparatus includes: an identification information request sending section that sends an identification information request to at least one of the second communication apparatuses; an individual identification information receiving section that receives individual identification information sent from the at least one of the second communication apparatuses; a first data request sending section that sends a data request including the received individual identification information to the at least one of the second communication apparatuses; a first common identification information storage section that stores common identification information; a second data request sending section that sends a data request including the stored common identification information to the at least one of the second communication apparatuses; and a data receiving section that receives data sent from the at least one of the second communication apparatuses, wherein the at least one of the second communication apparatuses includes: an individual identification information storage section that stores the individual identification information; a second common identification information storage section that stores the common identification information; an identification information request receiving section that receives the identification information request sent from the first communication apparatus; an individual identification information sending section that sends the stored individual identification information to the first communication apparatus in response to the received identification information request; a data request receiving section that receives the data request sent from the first communication apparatus; a first data sending section that sends first type data to the first communication apparatus when the identification information included in the received data request is the stored individual identification information; a second data sending section that sends second type data to the first communication apparatus when the identification information included in the received data request is the stored common identification information.

BRIEF DESCRIPTION OF THE DRAWINGS

The above and other aspects of the present invention will become more apparent and more readily appreciated from the following description of exemplary embodiments of the present invention taken in conjunction with the attached drawings, in which:

FIG. 4 is a schematic diagram illustrating one example of the contents of storage of a user table storage area according to the embodiment;

FIG. 5 is a schematic diagram illustrating one example of the contents of storage of a View table storage area according to the embodiment;

FIG. 6 is a schematic diagram illustrating one example of the contents of storage of an access information table storage area according to the embodiment;

DETAILED DESCRIPTION

Here, a part of the technical features described in the following embodiments is summarized.

(Aspect 1) A data providing system may be, for example, a system capable of using at least Version 3 of SNMP.

(Aspect 2) A first communication apparatus may be a management server. Also, a second communication apparatus may be a printer. A network including the management server and the printer may further include a router.

(Aspect 3) The following system is also useful. That is, a data providing system comprises a first communication apparatus and a second communication apparatus for providing data to the first communication apparatus. The first communication apparatus includes: a time synchronization information request sending section that sends a time synchronization information to the second communication apparatus; an individual time synchronization information receiving section that receives individual time synchronization information sent from the second communication apparatus; a first common time synchronization information storage section that stores common time synchronization information; a first data request sending section that sends a data request including the received individual time synchronization information to the second communication apparatus; a second data request sending section that sends a data request including the stored common time synchronization information to the second communication apparatus; and a data receiving section that receives data sent from the second communication apparatus. The second communication apparatus includes: an individual time synchronization information storage section that stores the individual time synchronization information; a second common time synchronization information storage section that stores the common time synchronization information; a time synchronization information request receiving section that receives the time synchronization information request sent from the first communication apparatus; an individual time synchronization information sending section that sends the stored individual time synchronization information to the first communication apparatus in response to the received time synchronization information request; a data request receiving section that receives the data request sent form the first communication apparatus; a first data sending section that sends the first type data to the first communication apparatus when the time synchronization information included in the received data request corresponds to the stored individual time synchronization information; and a second data sending section that sends the second type data to the first communication apparatus when the time synchronization information included in the received data request is the stored common time synchronization information.

Figure 1:
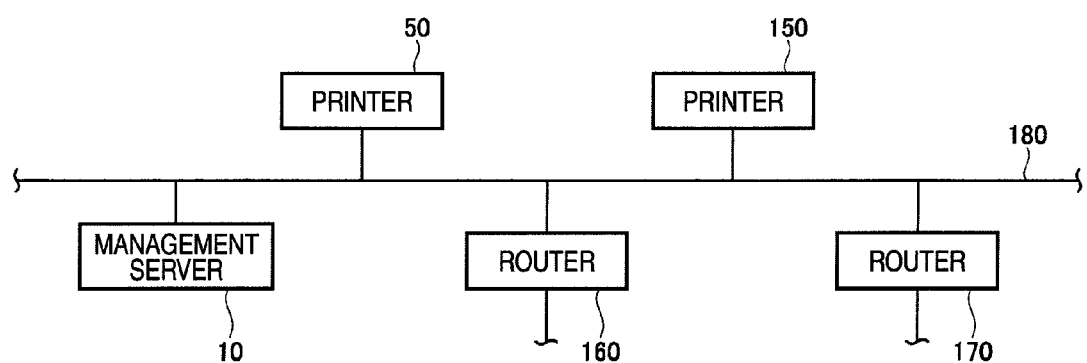
FIG. 1 is a schematic diagram illustrating one example of a configuration of a printer network system according to an embodiment of the present invention.

An embodiment of the present invention will be discussed below with reference to the accompanying drawings:

As shown in FIG. 1, the printer network system 2 comprises a management server 10, printers 50, 150, routers 160, 170, etc. In FIG. 1, the two printers 50, 150 and routers 160, 170 are only shown, but multiple printers and routers are actually present. Also, it is not shown in FIG. 1, but the routers may be further connected to other printers etc. In the printer network system 2, the printers 50, 150 provide data for the management server 10 using SNMPv3. Unique engine IDs are allocated to the respective printers 50, 150 and routers 160, 170.

(Configuration of Management Server)

Figure 2:
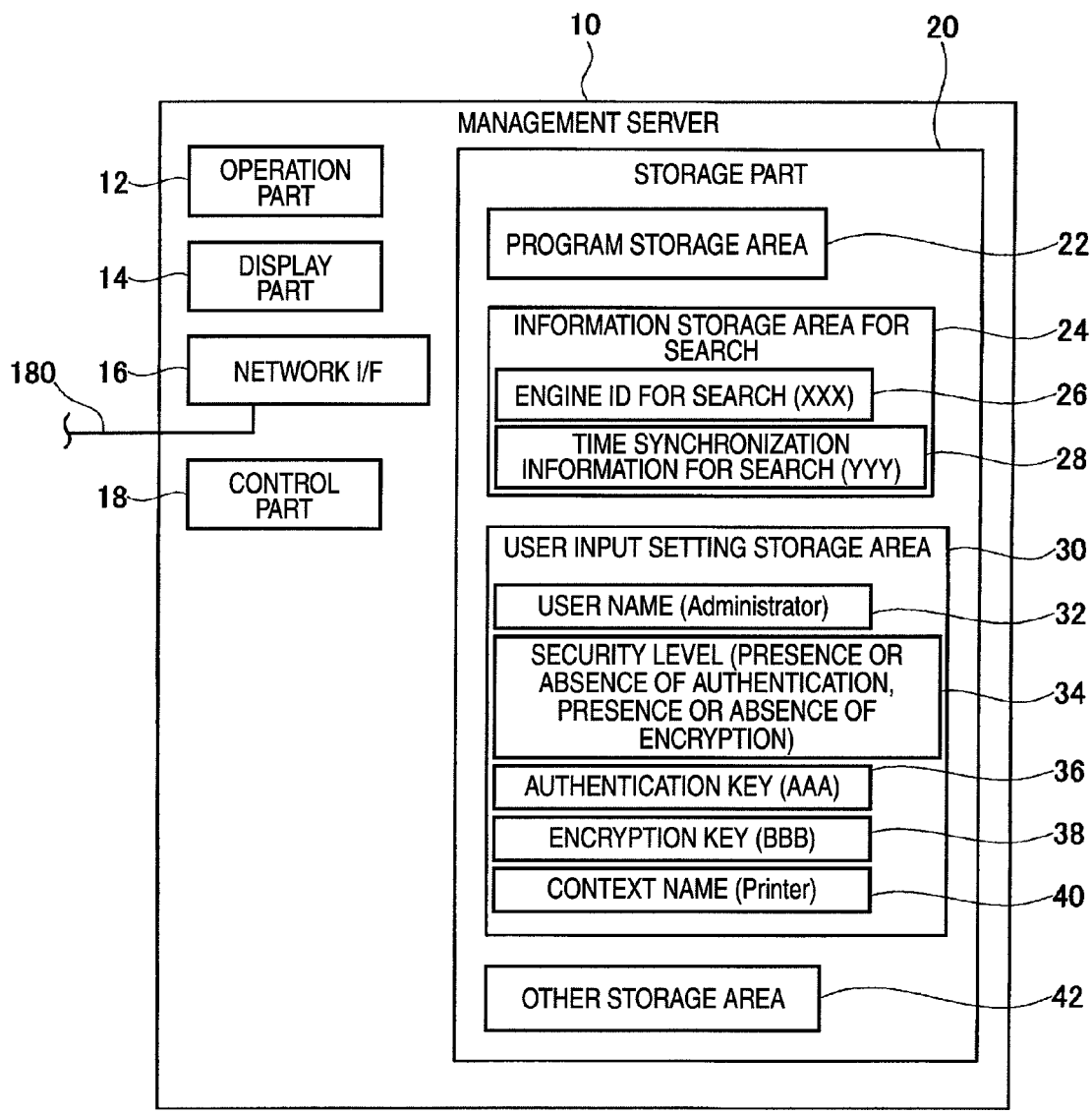
FIG. 2 is a schematic diagram illustrating one example of a configuration of a management server according to the embodiment.

A configuration of the management server 10 will be described. As shown in FIG. 2, the management server 10 has an operation part 12, a display part 14, a network interface 16, a control part 18, a storage part 20, etc.

The operation part 12 has a plurality of keys. A user can input various information to the management server 10 by operating the operation part 12. The display part 14 can display various information. The network interface 16 is connected to a LAN line 180. The LAN line 180 is connected to the management server 10, the printers 50, 150 and the routers 160, 170. The management server 10 can communicate with the printers 50, 150 and the routers 160, 170 through the network interface 16 and the LAN line 180. The control part 18 executes various processing according to a program stored in the storage part 20. The contents of the processing executed by the control part 18 will be described below in detail.

The storage part 20 is constructed by ROM, EEPROM, RAM, etc. The storage part 20 has a program storage area 22, an information storage area 24 for search, a user input setting storage area 30, other storage area 42, etc. The program storage area 22 stores a program to be executed by the management server 10. For example, the program storage area 22 stores a program for conducting communication using SNMPv3.

The information storage area 24 for search stores an engine ID 26 for search and time synchronization information 28 for search. The engine ID 26 for search is an engine ID common to the management server 10, the printers 50, 150 and the routers 160, 170. In the present example, the engine ID 26 for search is "XXX". The time synchronization information 28 for search is time synchronization information common to the management server 10, the printers 50, 150 and the routers 160, 170. In the present example, the time synchronization information 28 for search is "YYY".

The user input setting storage area 30 has a user name 32, a security level 34, an authentication key 36, an encryption key 38 and a context name 40. The user input setting storage area 30 stores information inputted by a user. The user name 32 is a name of a user using the management server 10. In the present example, a plurality of users can share the management server 10. For example, a user of an administrator level uses a user name of "Administrator". Also, for example, a general user uses a user name of "User". Each of the users inputs a user name by operating the operation part 12 in the case of using the management server 10. The inputted user name is stored in the user input setting storage area 30. The security level 34 indicates the presence or absence of authentication and the presence or absence of encryption. The authentication key 36 and the encryption key 38 are respectively keys necessary for authentication and encryption of a message. In the present example, the authentication key 36 is "AAA" and the encryption key 38 is "BBB". The context name 40 is information used in SNMPv3 and is used in the case of setting a View name described below. In the present example, "Printer" is adopted as the context name 40. The other storage area 42 can store information other than the information to be stored in the program storage area 22, the information storage area 24 for search and the user input setting storage area 30.

(Configuration of Printer)

Figure 3:
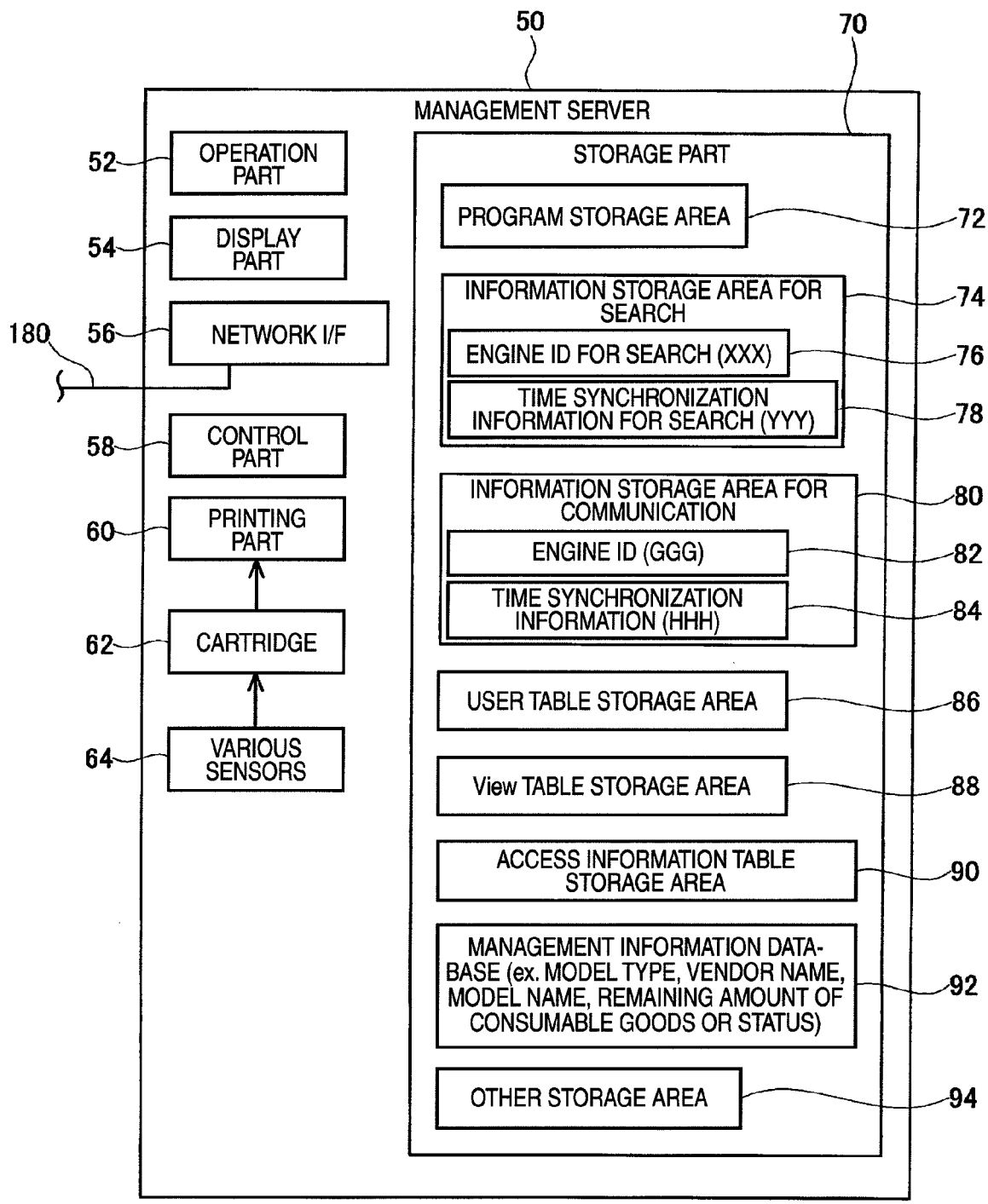
FIG. 3 is a schematic diagram illustrating one example of a configuration of a printer according to the embodiment.

Subsequently, a configuration of the printer 50 will be described. The printer 150 has a configuration similar to that of the printer 50. Because of this, detailed description of the printer 150 is omitted. As shown in FIG. 3, the printer 50 has an operation part 52, a display part 54, a network interface 56, a control part 58, a printing part 60, a cartridge 62, various sensors 64, a storage part 70, etc. The operation part 52 has a plurality of keys. A user can input various information to the printer 50 by operating the operation part 52. The display part 54 can display various information. The network interface 56 is connected to the LAN line 180. The network interface 56 is an interface for communicating with the management server 10 by the printer 50. The control part 58 executes various processing according to a program stored in the storage part 70. The contents of the processing executed by the control part 58 will be described below in detail. Various sensors 64 detect, for example, the remaining amount of toner of the cartridge 62. The printing part 60 does printing using the cartridge 62.

The storage part 70 is constructed by ROM, EEPROM, RAM, etc. The storage part 70 has a program storage area 72, an information storage area 74 for search, an information storage area 80 for communication, a user table storage area 86, a View table storage area 88, an access information table storage area 90, a management information database 92, other storage area 94, etc. The program storage area 72 stores a program to be executed by the printer 50. For example, the program storage area 72 stores a program for conducting communication using SNMPv3, a program for doing printing, etc.

The information storage area 74 for search stores an engine ID 76 for search and time synchronization information 78 for search. The engine ID 76 for search is the same (XXX) as the engine ID 26 for search stored in the management server 10. The time synchronization information 78 for search is the same (YYY) as the time synchronization information 28 for search stored in the management server 10.

The information storage area 80 for communication stores an engine ID 82 and time synchronization information 84. The engine ID 82 is a unique ID allocated to the printer 50. The management server 10 can use the engine ID 82 in order to identify the printer 50. In the present example, the engine ID 82 of the printer 50 is "GGG". The time synchronization information 84 is also information unique to the printer 50. As described below in detail, the time synchronization information 84 includes the number of activations of the printer 50 and elapsed time since the latest activation start. Therefore, the time synchronization information 84 is updated every time activation of the printer 50 is started. Also, the time synchronization information 84 changes with time. In the present example, the time synchronization information 84 of the printer 50 is "HHH".

The user table storage area 86 stores an encryption key and an authentication key of each user. As shown in FIG. 4, the user table storage area 86 stores a user table 200. The user table 200 includes combination data 210, and combination data 212. In each of the combination data 210, 212, a user name 220, an authentication key 222 and an encryption key 224 are associated. The user name 220 indicates a name of a user. The authentication key 222 is used for authentication of a received packet. In the present example, in the case of including a value in which the whole packet is digested using the authentication key 36 in a packet from the management server 10, a packet is digested using the authentication key 222 corresponding to a user name included in the packet in the printer 50. Authentication is performed by comparing values of two message digests. When the packet is falsified by a third party in a communication process, the values of two message digests do not match. Consequently, it can be found that the packet is falsified. In the present example, the authentication key 222 is "AAA" when the user name 220 is "Administrator". Also, the authentication key 222 is "CCC" when the user name 220 is "User".

The encryption key 224 is used for encryption of a packet. In the present example, the encryption key 224 is "BBB" when the user name 220 is "Administrator". Also, the encryption key 224 is "DDD" when the user name 220 is "User". In the management server 10, a packet can be encrypted using the encryption key 38 (BBB). In the printer 50 receiving this packet, the packet is decoded using the encryption key 224 corresponding to a user name included in the packet.

The View table storage area 88 stores a View table 230. As shown in FIG. 5, the View table 230 includes combination data 240, combination data 242, and combination data 244. In each of the combination data 240, 242, 244, a View name 250 and target information 252 are associated. The View name 250 will be described below in detail. The target information 252 indicates a kind of information permitted to be provided for the management server 10. In the present example, the target information 252 is "all the management information" when the View name 250 is "Management". That is, when "Management" is identified as the View name by processing described below, the printer 50 permits all the own information to be provided for the management server 10. When the View name 250 is "User", the target information 252 is "minimum information necessary for use of a printer". When "User" is identified as the View name, the printer 50 permits a limited kind of information (for example, a model name, the remaining amount of consumable goods or a status) to be provided for the management server 10. When the View name 250 is "Discover", the target information 252 is "minimum information necessary for search of a printer". When "Discover" is identified as the View name, the printer 50 permits a more limited kind of information (for example, a model type, a vendor name or a model name) than the case of the View name "User" to be provided for the management server 10. That is, in the case of the present example, in order of "Management", "User" and "Discover" of the View names, the kinds of information which the printer 50 can be provided for the management server 10 are limited and a security level of information capable of being provided also becomes lower. In other words, when the View name 250 is "Discover", the printer 50 provides only information with low security.

The access information table storage area 90 stores an access information table 260. As shown in FIG. 6, the access information table 260 includes combination data 270, combination data 272, combination data 274, combination data 276, and combination data 278. In each of the combination data 270, 272, 274, 276, 278, a context name 280, a user name 282, a security level 284, a View type 286 and a View name 288 are associated. The context name 280 has the same meaning as the context name 40 described above and is used in SNMPv3. The user name 282 indicates a name of a user. The security level 284 is information about the presence or absence of encryption and authentication of a packet. The View type 286 is information for identifying a change in a setting value and provision of data. When the View type 286 is "READ", it means data provision. When the View type 286 is "WRITE", it means a change in a setting value. The View name 288 corresponds to the View name 250 of the View table 230 described above. As described below in detail, the printer 50 identifies the View name 288 from the information 280 to 286 of the combination data 270.

The management information database 92 stores various information about the printer 50. The management information database 92 stores a status (for example, the remaining amount of consumable goods) detected by, for example, a model type, a vendor name, a model name or the sensors 64. The other storage area 94 can store information other than the information to be stored in each of the program storage areas 72, 74, 80, 86, 88, 90, 92 described above.

(Management Information Acquisition Processing of Server)

Figure 7:
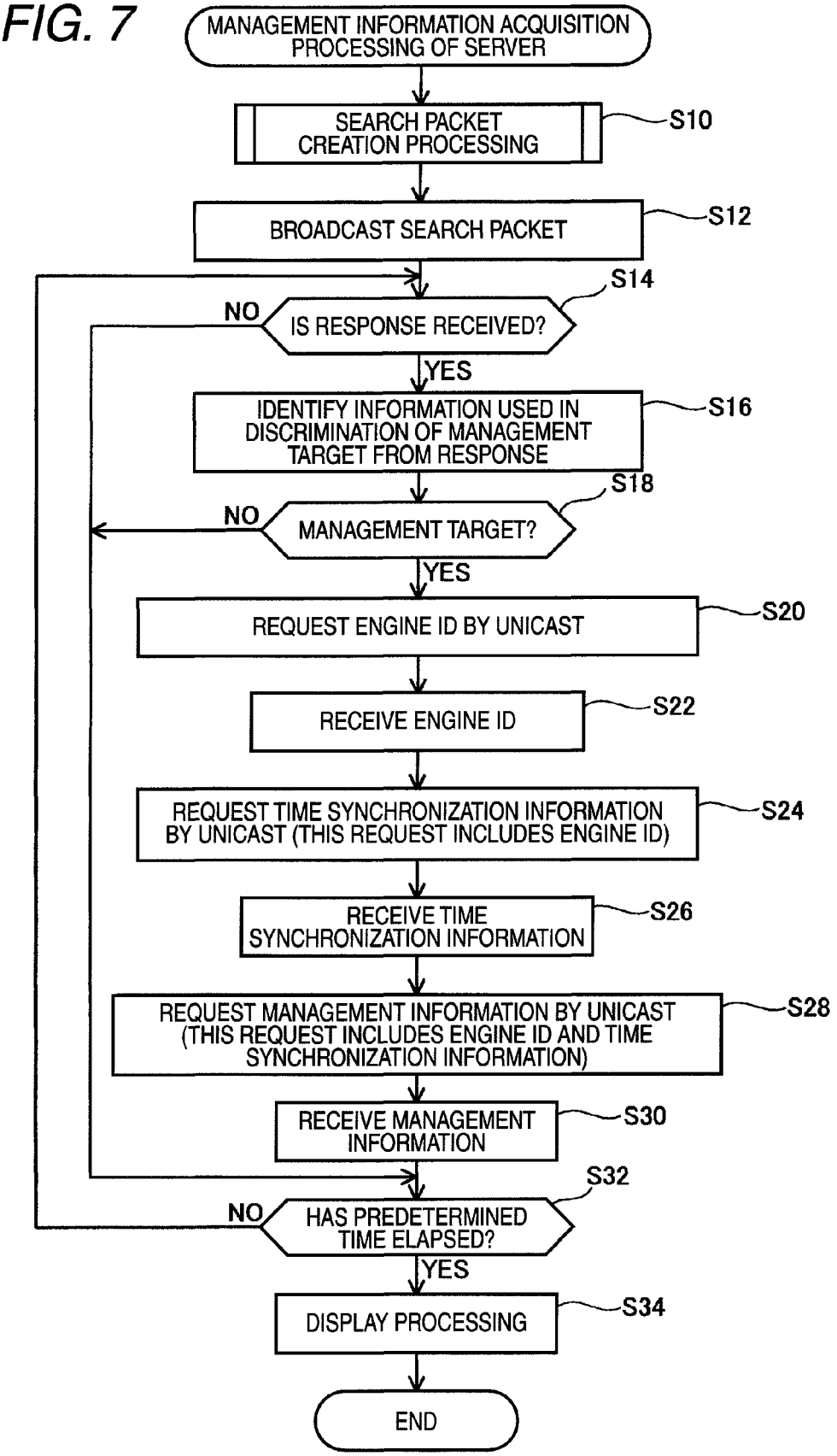
FIG. 7 is a flowchart of management information acquisition processing of a server according to the embodiment.

The contents of management information acquisition processing of a server executed by the control part 18 of the management server 10 will be described. As shown in FIG. 7, the control part 18 performs search packet creation processing (S10). The contents of a packet will be first described before description of this search packet creation processing.

Figure 10:
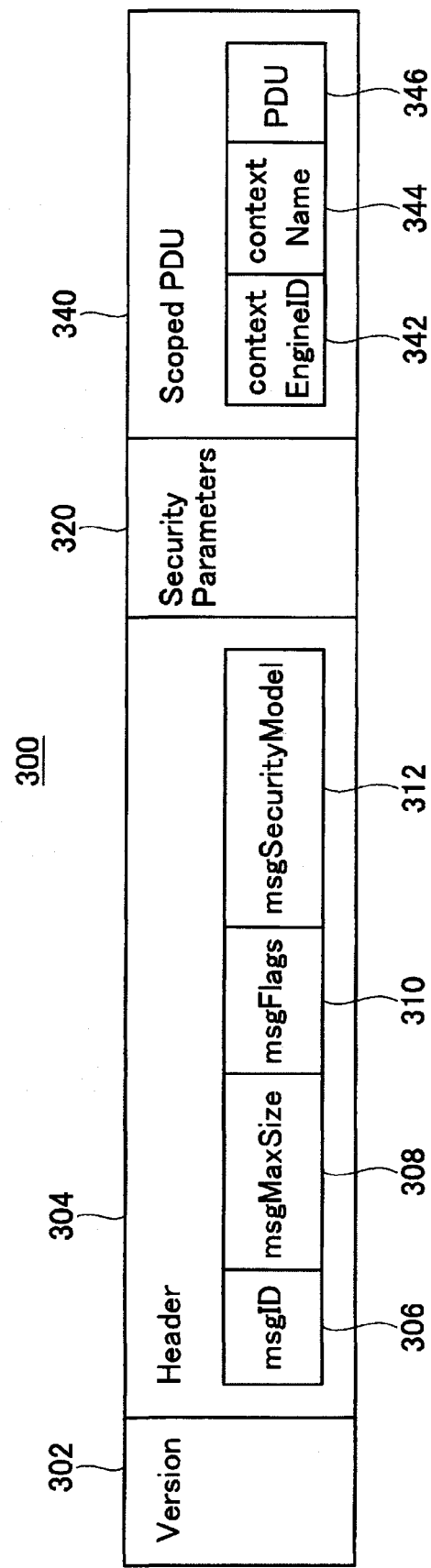
FIG. 10 is a schematic diagram illustrating one example of the contents of a packet according to the embodiment.

The packet 300 includes information (for example, PDU, time synchronization information or an engine ID of the printer 50) necessary for communication between the management server 10 and the printer 50. As shown in FIG. 10, the packet 300 is constructed of Version 302, Header 304, Security Parameters 320 and Scoped PDU 340. The Version 302 is information indicating a version of SNMP and is SNMPv3 (version 3) in the present example. Next, the contents of the Header 304 will be described. The Header 304 is constructed of msgID 306, msgMaxSize 308, msgFlags 310 and msgSecuritymodel 312. The control part 18 can create a unique ID every packet by incrementing the number of packet communications. The ID created in this manner is stored in the msgID 306. The msgMaxSize 308 includes information about a data size of the packet 300. The msgFlags 310 includes information about the presence or absence of encryption and the presence or absence of authentication. The msgSecuritymodel 312 is an area in which information used in the case of extending a protocol is stored.

Figure 11:
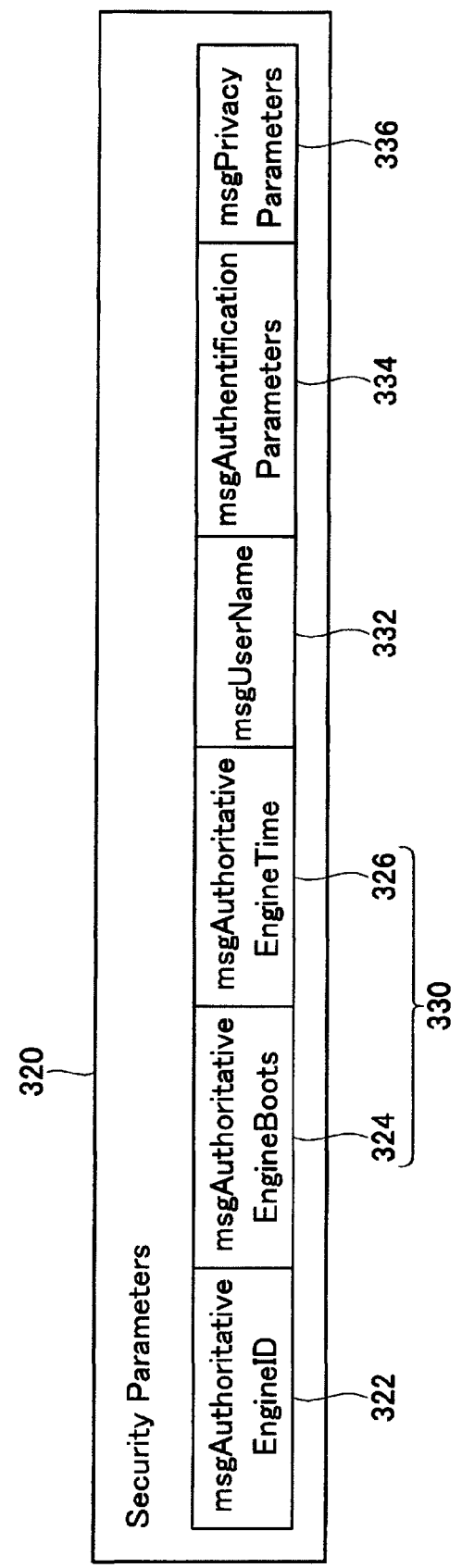
FIG. 11 is a schematic diagram illustrating a part of the packet in further detail.

Then, the contents of the Security Parameters 320 will be described. As shown in FIG. 11, the Security Parameters 320 is constructed of various items 322, 324, 326, 332, 334, 336.

An engine ID is stored in msgAuthoritativeEngineID 322. Information about the number of activations of an agent device (for example, the printer 50 in the present example) is stored in msgAuthoritativeEngineBoots 324. Elapsed time since the latest activation start of the agent device is stored in msgAuthoritativeEngineTime 326. That is, information 330 in which the msgAuthoritativeEngineBoots 324 and the msgAuthoritativeEngineTime 326 are combined is time synchronization information. A user name is stored in msgUserName 332. The control part 18 can create a message digest by digesting the whole packet using the authentication key 36. This message digest is stored in msgAuthentificationParameters 334. Information necessary to decode the encrypted information is stored in msgPrivacyParameters 336.

Then, the contents of the Scoped PDU 340 shown in FIG. 10 will be described. As shown in FIG. 10, the Scoped PDU 340 is constructed of contextEngineID 342, contextName 344 and PDU 346. An engine ID is stored in the contextEngineID 342. The same engine ID as that of the msgAuthoritativeEngineID 322 (see FIG. 11) is stored in this item 342. A context name is stored in the contextName 344.

Figure 12:
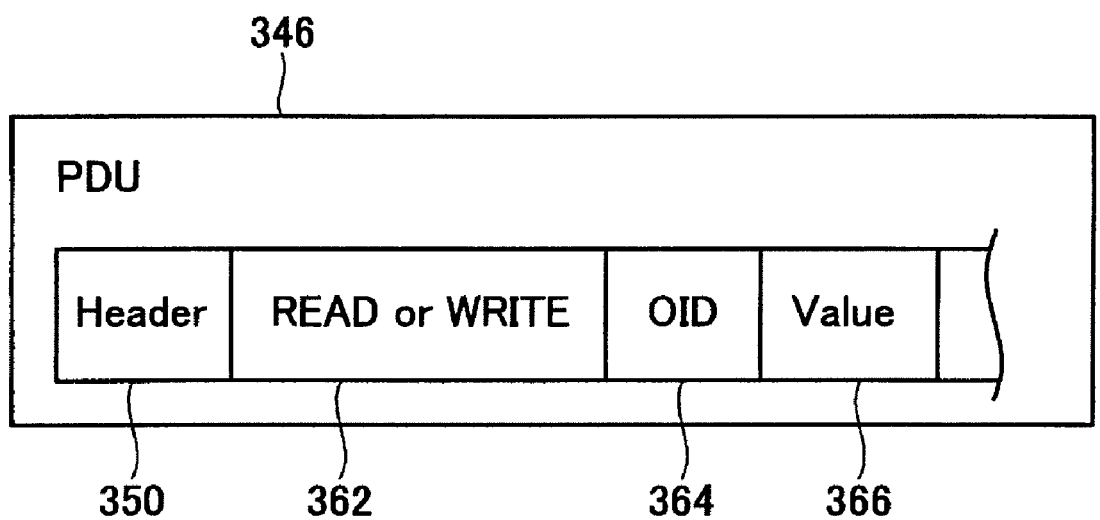
FIG. 12 is a schematic diagram illustrating a part of the packet in further detail.

As shown in FIG. 12, the PDU 346 is constructed of Header 350, a View type 362, OID 364 and Value 366. Either READ or WRITE is stored in the View type 362. Information (for example, an identifier of data) for identifying a kind of requested data is stored in the OID 364. When "WRITE" is set in the View type 362, a setting value is stored in the Value 366.

Figure 8:
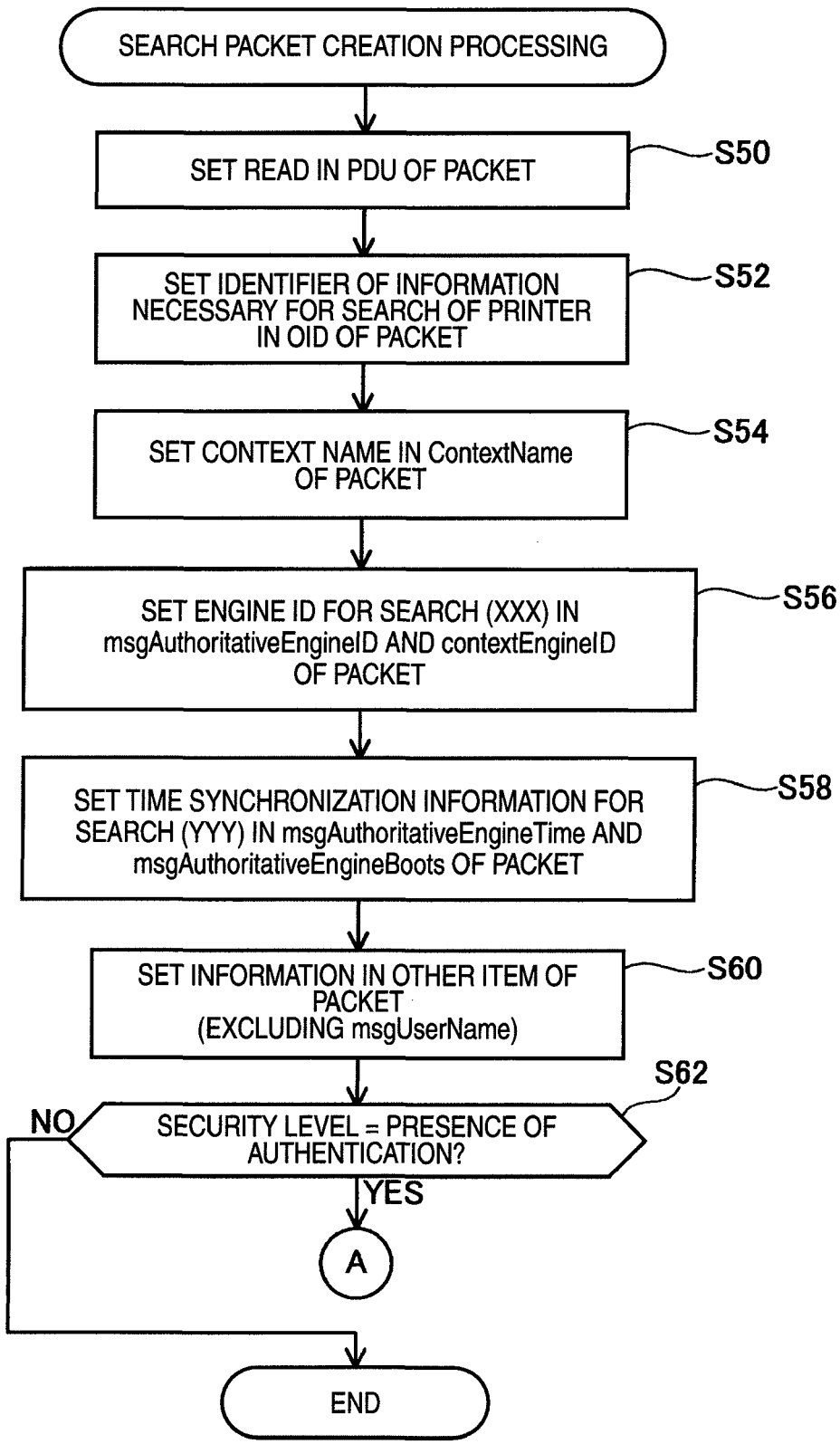
FIG. 8 is a flowchart of search packet creation processing according to the embodiment.

Next, the contents of the search packet creation processing will be described with reference to FIGS. 8 and 9. In the present example, the following description is continued assuming that the management server 10 requests acquisition (READ) of information from the printer 50. As shown in FIG. 8, in S50, the control part 18 sets "READ" in the View type 362 (see FIG. 12) of the PDU 346 of the packet 300. Then, the control part 18 sets an identifier (for example, a model type) of information necessary to identify a printer from among a device group (a printer and a router) present in a network in the OID 364 (see FIG. 12) of the PDU 346 of the packet 300 (S52). Then, the control part 18 sets a context name (for example, "Printer" in the example of FIG. 2) in the contextName 344 (see FIG. 10) of the packet 300 (S54). The control part 18 performs the processing of S54 by reading out the contents of the context name 40 (see FIG. 2) of the user input setting storage area 30.

Then, the control part 18 sets the engine ID 26 for search (XXX) in the msgAuthoritativeEngineID 322 (see FIG. 11) and the contextEngineID 342 (see FIG. 10) of the packet 300 (S56). Then, the control part 18 sets the time synchronization information 28 for search (YYY) in the time synchronization information 330 (see FIG. 11) of the packet 300 (S58).

Then, the control part 18 sets information excluding the msgUserName 332 in other items of the packet 300 in S60. That is, the control part 18 writes information into all the items capable of setting at the present time. For example, the control part 18 writes the security level 34 (see FIG. 2) stored in the user input setting storage area 30 into the msgFlags 310 (see FIG. 10). Also, the control part 18 writes information into the items 304, 346, etc. Then, the control part 18 decides whether or not the security level 34 stored in the user input setting storage area 30 is set in the "presence of authentication" (S62). In the case of YES in S62, the flowchart proceeds to S80 of FIG. 9. On the other hand, in the case of NO in S62, the search packet creation processing is ended.

Figure 9:
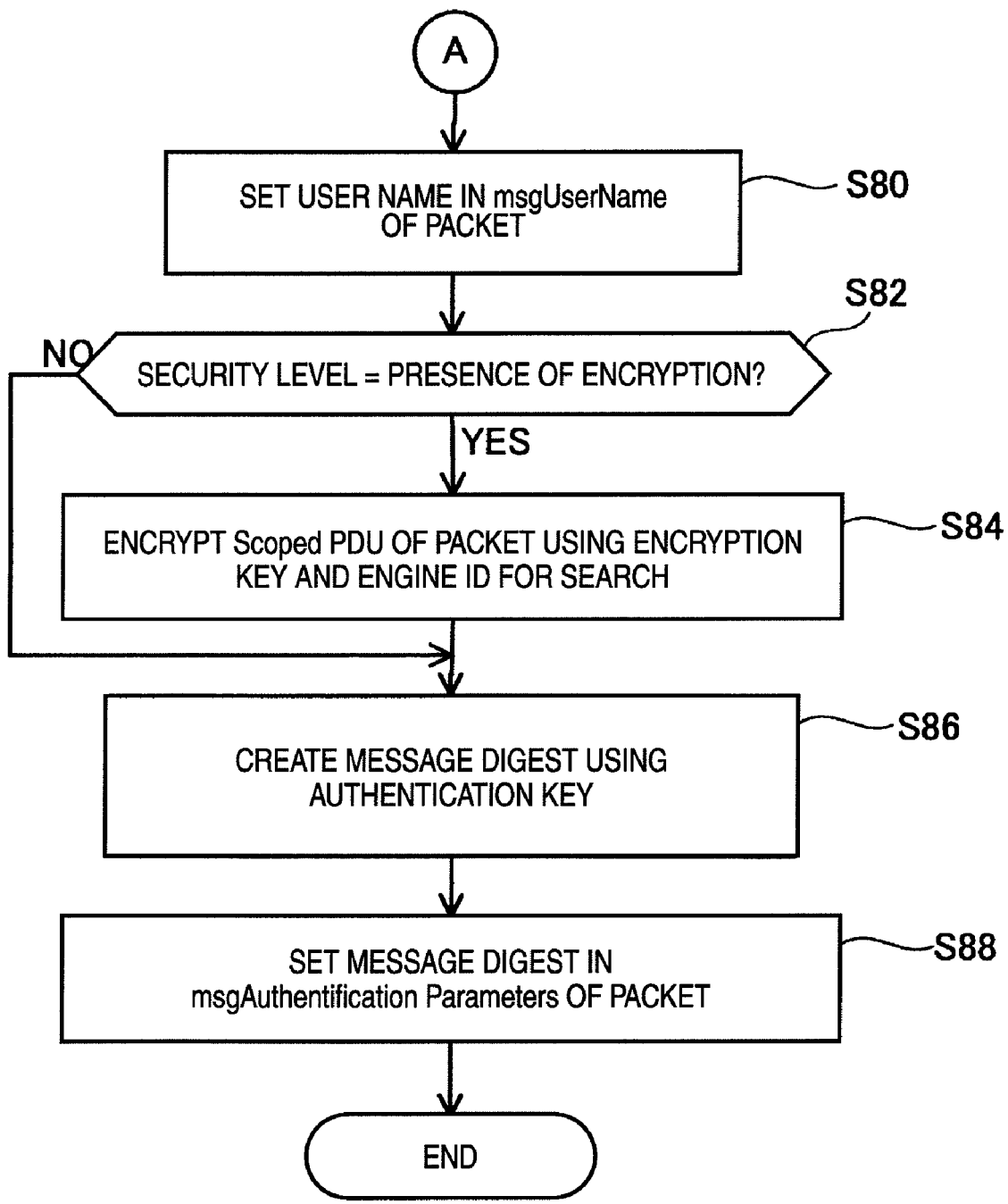
FIG. 9 is the flowchart subsequent to FIG. 8.

As shown in FIG. 9, in S80, the control part 18 sets the user name 32 stored in the user input setting storage area 30 in the msgUserName 332 (see FIG. 11) of the packet 300. For example, the control part 18 sets a user name "Administrator" in the msgUserName 332. Then, the control part 18 decides whether or not the security level 34 stored in the user input setting storage area 30 is set in the "presence of encryption" (S82). In the case of NO herein, the flowchart skips S84 and proceeds to S86. On the other hand, in the case of YES in S82, the control part 18 encrypts the Scoped PDU 340 (see FIG. 10) of the packet 300 using the engine ID 26 for search (XXX) stored in the information storage area 24 for search and the encryption key 38 (BBB) stored in the user input setting storage area 30 (S84). When S84 is ended, the flowchart proceeds to S86.

In S86, the control part 18 creates a message digest by digesting (hashing) the whole packet 300 using the authentication key 36 (AAA) stored in the user input setting storage area 30. In the case of this digesting, zero is set in the msgAuthentification Parameters 334 (see FIG. 11). Then, the control part 18 sets a value of the message digest created in S86 in the msgAuthentification Parameters 334 of the packet 300 (S88). When S88 is ended, the search packet creation processing is ended. In this case, the flowchart proceeds to S12 of FIG. 7.

As shown in FIG. 7, in S12, the control part 18 broadcasts a search packet created in S10. As a result of this, the search packet is sent to all the printers and routers connected through the LAN line 180. Subsequently, the control part 18 decides whether or not a response to the search packet sent in S12 is received (S14). In the case of NO herein, the flowchart proceeds to S32. On the other hand, in the case of YES in S14, the flowchart proceeds to S16.

In S16, the control part 18 identifies information used in discrimination of a management target from the contents of the response received in S14. The control part 18 discriminates the management target by, for example, a model type. That is, in the present example, as a result of broadcasting the search packet in S12, a response including information about the model type is sent from each of the devices (printers 50, 150 and routers 160, 170). The control part 18 identifies (reads) information about the model type included in the response.

Then, the control part 18 decides whether or not a sending source of the response is the management target (that is, a printer) (S18). In the case of NO herein, the flowchart proceeds to S32. On the other hand, in the case of YES in S18, the control part 18 requests an engine ID from the sending source (for example, the printer 50) of the response by unicast (S20). In addition, in the present example, the following description is continued assuming that the sending source of the response is the printer 50. When the request of S20 is sent, the printer 50 sends an individual engine ID (GGG) set in its own printer to the management server 10. The management server 10 receives the engine ID (GGG) of the printer 50 (S22). Subsequently, the control part 18 requests time synchronization information from the printer 50 by unicast (S24). This request includes the engine ID received in S22. The printer 50 sends its own time synchronization information 84 (HHH) to the management server 10 on condition that the engine ID included in a data request sent from the management server 10 in S24 matches with its own engine ID 82 (GGG). The management server 10 receives the time synchronization information 84 (HHH) about the printer 50 (S26).

Subsequently, the control part 18 requests management information (for example, a status) about the printer 50 by unicast (S28). This request packet is created by a technique similar to the search packet creation processing (FIGS. 8 and 9) of S10. However, the search packet creation processing in S28 differs from the search packet creation processing of S10 in that the engine ID received in S22 and the time synchronization information received in S26 are used. Also, a packet for requesting a model type is created in the search packet creation processing of S10. On the other hand, a packet for requesting information (for example, a status) of a kind preset by a user is created in the search packet creation processing in S28. The printer 50 sends a response including the management information (for example, a status) by executing the processing described below based on the packet sent from the management server 10 in S28. The management server 10 receives the management information (S30). When S30 is ended, the flowchart proceeds to S32.

In S32, the control part 18 decides whether or not a predetermined time has elapsed since the search packet was broadcast in S12. In the case of NO herein, the flowchart returns to S14. On the other hand, in the case of YES in S32, the control part 18 displays the management information (management information about each device of a management target) received in S30 on the display part 14 (S34). Consequently, a user can acquire desired management information (for example, a status of each device targeted for management).

(Request Packet Receiving Processing of Printer)

Figure 13:
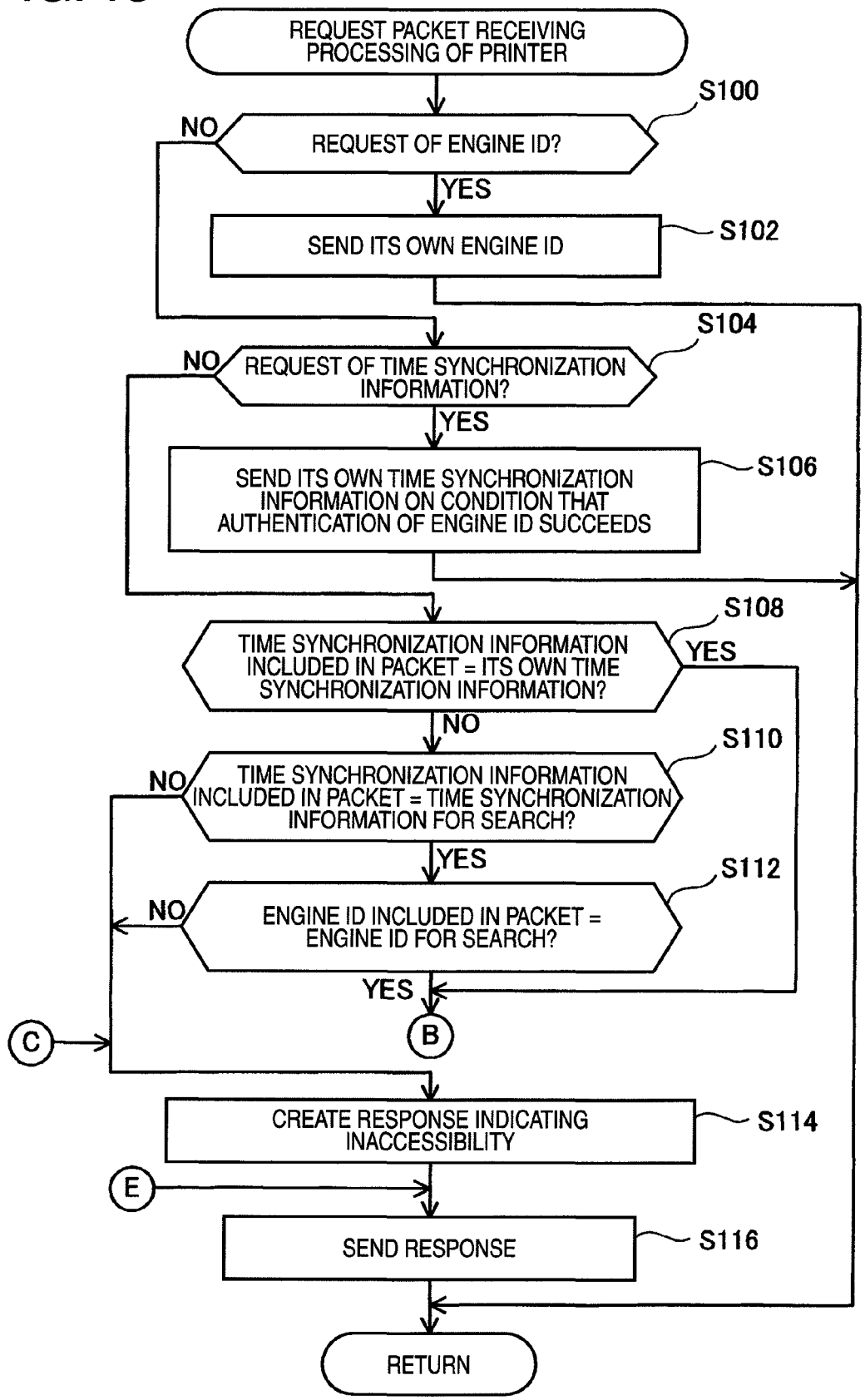
FIG. 13 is a flowchart of request packet receiving processing of a printer according to the embodiment.

Subsequently, the contents of request packet receiving processing executed by a printer will be described. In the present example, the following description is continued assuming that the printer 50 receives a data request from the management server 10. In addition, the printer 150 executes similar processing and also the routers 160, 170 execute similar processing. As shown in FIG. 13, the control part 58 of the printer 50 decides whether or not a data request from the management server 10 is a request of an engine ID (S100). In the case of YES herein, the control part 58 sends a response including its own engine ID 82 (GGG) to the management server 10 (S102).

In the case of NO in S100, the control part 58 decides whether or not the data request from the management server 10 is a request of time synchronization information (S104). In addition, the engine ID 82 (GGG) of the printer 50 is included in this data request. In the case of YES in S104, the control part 58 sends a response including its own time synchronization information 84 (HHH) to the management server 10 on condition that the engine ID included in the received data request matches with its own engine ID 82 (S106).

On the other hand, in the case of NO in S104, the control part 58 decides whether or not time synchronization information included in the received data request is within a predetermined time from its own time synchronization information 84 (S108). The control part 58 makes the decision of S108 by reading out the time synchronization information 84 stored in the information storage area 80 for communication. That is, the printer 50 performs authentication by its own time synchronization information 84. In the case of YES herein, the flowchart proceeds to S130 of FIG. 14. On the other hand, in the case of NO in S108, the control part 58 decides whether or not the time synchronization information included in the data request is the time synchronization information 78 for search (XXX) (S110). The control part 58 makes the decision of S110 by reading out the engine ID 76 for search stored in the information storage area 74 for search.

In the case of YES in S110, the control part 58 decides whether or not the engine ID included in the received data request is an engine ID for search (YYY) (S112). The control part 58 makes the decision of S112 by reading out the time synchronization information 78 for search stored in the information storage area 74 for search. In the case of YES in S112, the flowchart proceeds to S130 of FIG. 14.

In the case of NO in S110 or S112, the control part 58 creates a response indicating inaccessibility (S114). Subsequently, the control part 58 sends the response created in S114 to the management server 10 (S116). In this case, the management server 10 cannot acquire management information from the printer 50.

Figure 14:
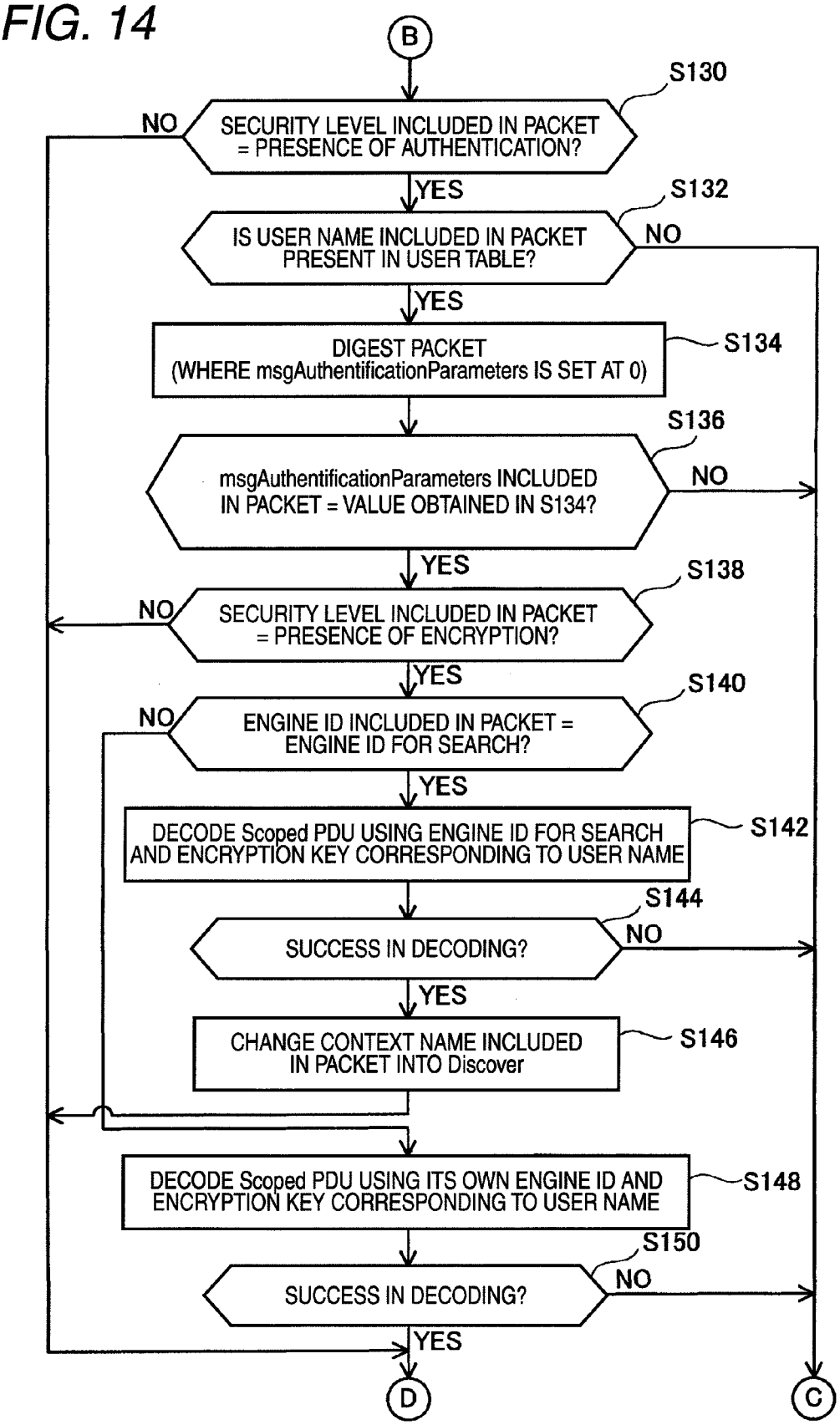
FIG. 14 is the flowchart subsequent to FIG. 13.

As shown in FIG. 14, in S130, the control part 58 decides the presence or absence of authentication by reading out a security level (msgFlags 310 (see FIG. 10)) included in the received data request (for example, the packet 300) (S130). In the case of the absence of authentication (NO in S130), the flowchart proceeds to S170 of FIG. 15. On the other hand, in the case of the presence of authentication (YES in S130), the control part 58 decides whether or not a user name (msgUserName 332 (see FIG. 11)) included in the received request packet is included in the user table 200 stored in the user table storage area 86 (S132). In the case of NO in S132, the flowchart proceeds to S114 of FIG. 13 and the control part 58 creates the response indicating inaccessibility.

On the other hand, in the case of YES in S132, the control part 58 digests the data request (the whole packet 300) (S134). First, the control part 58 reads the authentication key 222 corresponding to a user name included in the data request out of the user table 200. Using this authentication key, the control part 58 digests a request packet and creates a message digest. For example, when the user name included in the data request is "Administrator", digesting is performed using an authentication key "AAA". In addition, in the case of executing this processing, the msgAuthentificationParameters 334 (see FIG. 11) included in the data request is set at zero.

The control part 58 decides whether or not a value written into the msgAuthentificationParameters 334 of the data request matches with a value obtained in S134 (S136). In the case of NO in S136, the flowchart proceeds to S114 and the control part 58 creates the response indicating inaccessibility. That is, the fact that the value of the message digest differs has a possibility of, for example, falsifying data by a third party in a communication process, so that the control part 58 rejects access.

In the case of YES in S136, the control part 58 decides the presence or absence of encryption by reading out a security level (msgFlags 310 (see FIG. 10)) included in the data request (S138). In the case of the absence of encryption (NO in S138), the flowchart proceeds to S170 of FIG. 15. On the other hand, in the case of the presence of encryption (YES in S138), the control part 58 decides whether or not an engine ID (msgAuthoritativeEngineID 322 (see FIG. 11)) included in the data request is the engine ID 76 for search (XXX) (S140). In the case of NO herein, the flowchart proceeds to S148.

On the other hand, in the case of YES in S140, the control part 58 decodes the Scoped PDU 340 (see FIG. 10) included in the data request using the engine ID 76 for search and the encryption key 224 corresponding to a user name included in the data request (S142). First, the control part 58 reads the encryption key 224 corresponding to the user name included in the data request out of the user table 200. For example, when the user name included in the data request is "Administrator", an encryption key "BBB" is read out. In this case, the Scoped PDU 340 is decoded using the encryption key "BBB" and the engine ID for search (XXX). Next, the control part 58 decides whether or not to succeed in decoding in S142 (S144). In the case of NO herein, the flowchart proceeds to S114 and the control part 58 creates the response indicating inaccessibility.

On the other hand, in the case of YES in S144, the control part 58 changes a context name (contextName 344 (see FIG. 10)) included in the data request (S146). That is, the control part 58 changes the context name (for example, Printer) included in the data request into "Discover". When S146 is ended, the flowchart proceeds to S170 of FIG. 15.

In the case of NO in S140, the control part 58 decodes the Scoped PDU 340 using its own engine ID 82 (GGG) and the encryption key 224 corresponding to a user name included in the data request (S148). For example, when the user name included in the data request is "Administrator", the Scoped PDU 340 is decoded using an encryption key (BBB) and an engine ID (GGG). That is, the control part 58 decodes the Scoped PDU using its own engine ID 82 when the engine ID included in the data request is not the engine ID 76 for search.

Then, the control part 58 decides whether or not to succeed in decoding of the Scoped PDU 340 in S148 (S150). In the case of NO herein, the flowchart proceeds to S114 and the control part 58 creates the response indicating inaccessibility. On the other hand, in the case of YES in S150, the flowchart proceeds to S170 of FIG. 15.

Figure 15:
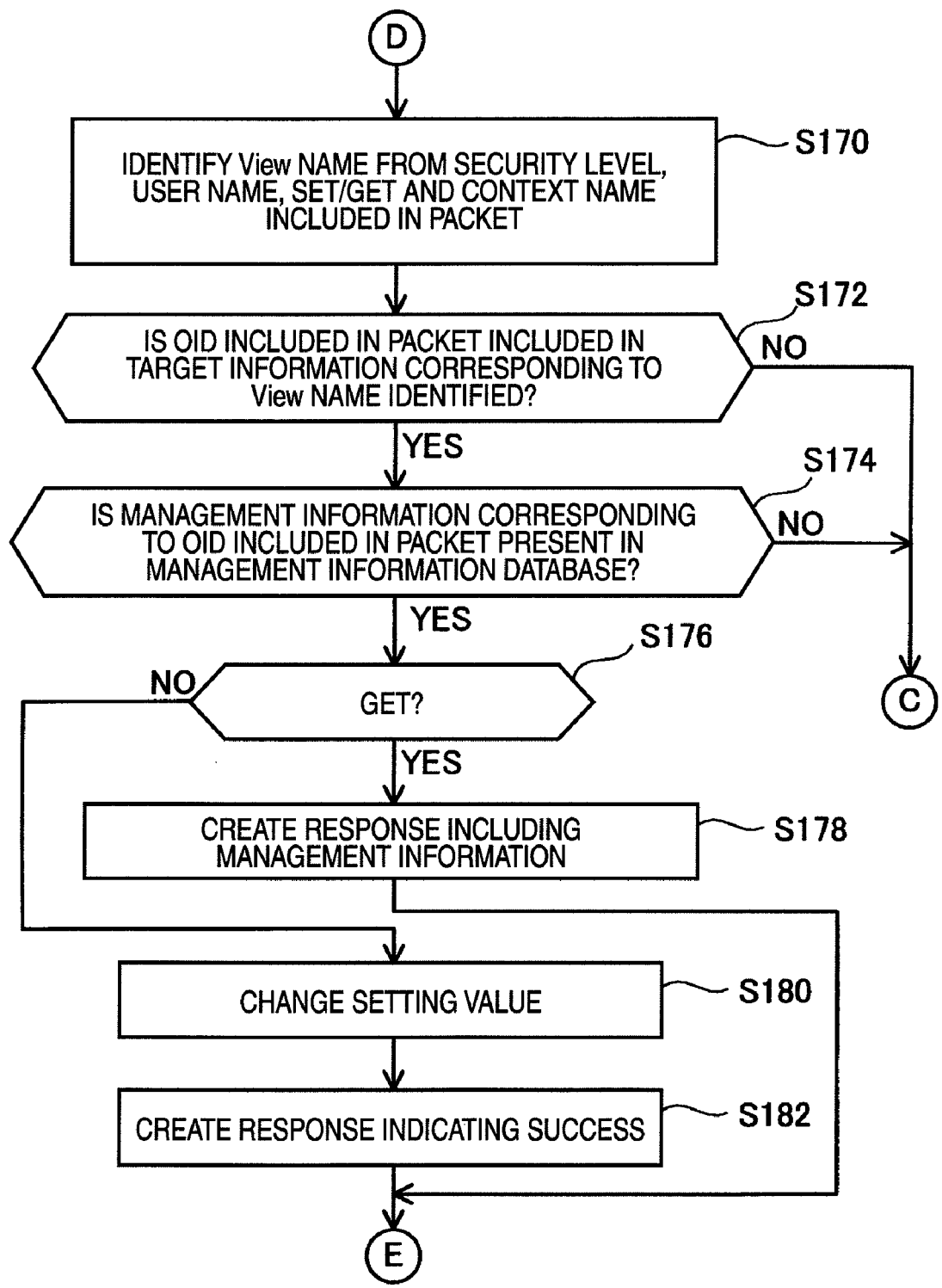
FIG. 15 is the flowchart subsequent to FIG. 14.

As shown in FIG. 15, in S170, the control part 58 identifies a View name. First, the control part 58 reads out the msgFlags 310 (see FIG. 10), the MsgUserName 332 (see FIG. 11), the View type 362 (see FIG. 12) and the contextName 344 (see FIG. 10) included in the data request. Next, the control part 58 identifies the View names 288 corresponding to these information from the access information table 260 (see FIG. 6). In addition, "READ" of the access information table 260 corresponds to "GET" and "WRITE" corresponds to "SET". For example, the control part 58 identifies "Menagement" as a View name when a context name is "Printer" and a user name is "Administrator" and a security level is "the presence of authentication/the presence of encryption" and a View type is "READ (that is, GET)".

When S170 is ended, the control part 58 decides whether or not management information (management information requested by a user) corresponding to the OID 364 (see FIG. 12) included in the data request is included in the target information 252 corresponding to the View name 288 identified in S170 (S172). The control part 58 reads out the contents of storage of the View table 230 (see FIG. 5) and makes the decision of S172. For example, status information shall be identified in the OID. For example, when "User" is identified as the View name in S170 herein, it becomes YES in S172 since the target information 252 corresponding to "User" includes the status information. On the other hand, for example, when "Discover" is identified as the View name in S170, it becomes NO in S172 since the target information 252 corresponding to "Discover" does not include the status information.

In addition, the control part 58 changes a context name into "Discover" in S146 of FIG. 14 when authentication is performed using the engine ID 76 for search and the time synchronization information 78 for search. Also, when the context name 280 is "Discover" in the access information table 260, the View name 288 becomes "Discover" regardless of other conditions such as a user name. As a result of this, the View name 288 always becomes "Discover" when authentication is performed using the engine ID 76 for search and the time synchronization information 78 for search. Therefore, regardless of a request of a user of the management server 10, information provided for the management server 10 is limited to the minimum information necessary for search of the printer.

Then, the control part 58 decides whether or not management information corresponding to the OID 364 (see FIG. 12) included in the request data is present in the management information database 92 (S174). In the case of NO in S174, the flowchart proceeds to S114 and the control part 58 creates the response indicating inaccessibility. On the other hand, in the case of YES in S174, the flowchart proceeds to S176.

The control part 58 decides whether the View type 362 (see FIG. 12) included in the data request is either SET (WRITE; change in a setting value) or GET (READ; provision of data) in S176. When the View type is GET herein, the control part 58 creates a response including management information corresponding to the OID 364 (see FIG. 12) included in the data request (S178). The control part 58 performs the processing of S178 by reading out the contents of storage of the management information database 92. When S178 is ended, the flowchart proceeds to S116 of FIG. 13 and the response is sent to the management server 10.

On the other hand, in the case of NO in S176, that is, when the contents included in the View type 362 are SET, the control part 58 changes its own setting value corresponding to the OID 364 included in the data request into a value written in the Value 366 (see FIG. 12) (S180). Then, the control part 58 creates a response indicating success in the change in the setting value in S180 (S182). When S182 is ended, the flowchart proceeds to S116 of FIG. 13 and the response is sent to the management server 10.

In the system 2 of the present example, data on a model type can be communicated without making a response and a request of a unique engine ID set in an individual device by storing the same engine ID for search (XXX) and time synchronization information for search (YYY) in each of the devices 10, 50, 150, 160, 170. Data with a low security level can be communicated by a technique with a low communication load. On the other hand, desired data (for example, status information) can also be communicated after a response and a request of a unique engine ID set in an individual device are made. Data with a high security level can also be communicated using a technique with a high security level used in normal SNMPv3. It seems simple that a technique for sending data with a high security level after authentication is performed using a data request including an engine ID and a technique for sending data with a low security level according to a predetermined data request without including an engine ID could be made concurrent. However, there is a situation difficult to adopt the latter technique. For example, in the case of constructing a data providing system using SNMPv3, the former technique is implemented by SNMPv3 while the latter technique is implemented by SNMPv1. There is a desire to set each of the devices so that communication cannot be conducted by SNMPv1 in order to increase security of data communication. It is difficult to make the former technique and the latter technique concurrent in the case of constructing such a system. The system 2 of the present example can implement both of communication of data with a high security level using a technique with a high security level and communication of data with a low security level by a technique with a low communication load in a framework of SNMPv3 without using SNMPv1 or SNMPv2.

The management server 10 can identify a device targeted for management by sending a data request including an engine ID for search and time synchronization information for search by broadcast and receiving a response to this. Hence, a communication load can be reduced. When the printer 50 receives the data request including the engine ID for search and the time synchronization information for search, a context name is changed and data (data with a low security level) corresponding to the context name after the change is sent. Further, even when the printer 50 receives a data request of management information (data with a high security level) from the management server 10 by the engine ID for search and the time synchronization information for search, the context name is changed, so that the requested management information cannot be sent as a response. That is, notification that access to the requested management information is not permitted is sent to the management server 10. Hence, data communication can be conducted while ensuring a security level.

The concrete example of the invention has been described above in detail, but these are only illustrative and the claims are not limited. Various modifications and changes in the concrete example illustrated above are included in the technique described in the claims. A modified example of the example described above is shown below.

For example, the information displayed on the display part 14 in S34 of FIG. 7 may be information (for example, a device name and a model name of a printer targeted for management) with a low security level among management information. When the management information is requested using an engine ID for search, the printer 50 etc. could send the information with the low security level described above by request. By using the engine ID for search, all the information to be displayed on the display part 14 can be acquired without requesting an engine ID from a printer individually. The management server 10 creates and displays a device list of devices (printers 50, 150) targeted for management based on information acquired from each of the devices. On the other hand, for example, when a user operates the operation part 12 from the displayed device list and thereby a predetermined device is specified, it may be constructed so as to execute processing for acquiring information with a high security level with respect to its specified device. The management server 10 can acquire information (information necessary to be displayed on the display part 14) with low security using the engine ID for search from a plurality of devices targeted for management. Also, information with high security can be acquired from only the specified device. Since management information is not acquired from the device which is not specified, a communication load for acquiring the management information can be reduced. Further, the communication load is reduced and thereby, the information displayed on the display part 14 can also be acquired speedily. Also, when the engine ID for search is broadcast, retrieval of a device targeted for management and acquisition of data with a low security level can be performed together and the communication load can be reduced further.

Also, the technical element described in the drawings or the present specification exercises technical usefulness by various combinations or singly, and is not limited to combination described in the claims at the time of application. Also, the technique illustrated in the drawings or the present specification simultaneously achieves a plurality of purposes, and has technical usefulness by achieving one of the purposes.

The present invention can be implemented in illustrative non-limiting aspects as follows:

In a first aspect, there is provided a data providing system comprising: a first communication apparatus (for example, a manager device); and a plurality of second communication apparatuses (for example, agent devices) that provide data to the first communication apparatus using a communication protocol (for example, SNMPv3) capable of performing authentication by identification information, wherein the first communication apparatus includes: an identification information request sending section that sends an identification information request to at least one of the second communication apparatuses; an individual identification information receiving section that receives individual identification information sent from the at least one of the second communication apparatuses; a first data request sending section that sends a data request including the received individual identification information to the at least one of the second communication apparatuses; a first common identification information storage section that stores common identification information (common identification information between the first communication apparatus and the second communication apparatuses); a second data request sending section that sends a data request including the stored common identification information to the at least one of the second communication apparatuses; and a data receiving section that receives data sent from the at least one of the second communication apparatuses, wherein the at least one of the second communication apparatuses includes: an individual identification information storage section that stores the individual identification information; a second common identification information storage section that stores the common identification information; an identification information request receiving section that receives the identification information request sent from the first communication apparatus; an individual identification information sending section that sends the stored individual identification information to the first communication apparatus in response to the received identification information request; a data request receiving section that receives the data request sent from the first communication apparatus; a first data sending section that sends first type data to the first communication apparatus when the identification information included in the received data request is the stored individual identification information; a second data sending section that sends second type data to the first communication apparatus when the identification information included in the received data request is the stored common identification information. For example, data in the second type data is more limited than data in the first type data. In addition, the term "when" described above does not exclude addition of other conditions (AND condition, OR condition). This similarly applies to the case of using the term "on condition" in the above description.

There are various data required by a data receiving device (the manager device in the example described above). While data of a type to be communicated by a method with high security is present, it is expected that data of a type without high security will also be present. Therefore, it is possible to reduce a communication load as a whole by communicating data of the former type by a method with high security and communicating data of the latter type without a high security level using a method with a small communication load.

According to the system described above, the at least one of the second communication apparatuses can send data to the first communication apparatus using any of individual identification information and common identification information in authentication. Here, the term "authentication" should be most broadly construed and is a concept including various authentication methods. Several authentication methods are illustrated. For example, the at least one of the second communication apparatuses may perform authentication by comparing identification information included in a data request sent from the first communication apparatus with the identification information (the individual identification information or the common identification information) stored in itself. Also, for example, when a data request from the first communication apparatus is encrypted as a key, the second communication apparatus may perform authentication by deciding whether or not to succeed in decoding the data request using identification information stored in itself as the key. Also, for example, when a first value in which the whole data request is summarized (digested) is included in a data request including identification information, the at least one of the second communication apparatuses may perform authentication by summarizing the data request and generating a second value and comparing the first value with the second value.

In the system described above, by storing common identification information in both of the first communication apparatus and the at least one of the second communication apparatuses, the second type data can be communicated without making a response and a request of individual identification information. On the other hand, the first type data can also be communicated after making the response and the request of the individual identification information. A technique for communicating data using common identification information in authentication differs from a technique for communicating data using individual identification information in authentication, and it is unnecessary to make a response and a request of individual identification information before data of an object is communicated. As a result of this, the former technique has an advantage that a communication load becomes smaller than that of the latter technique. In the case of using this system, data with a low security level can be communicated using the former technique and data with a high security level can be communicated using the latter technique. Both the techniques can be implemented in a framework of a protocol (for example, SNMPv3) for sending a data request including identification information.

In addition, authentication may be performed using time synchronization information as well as identification information. For example, in the case of SNMPv3, authentication can be performed using elapsed time since an activation start and the number of activations of an agent device. It is necessary for a manager device to request individual time synchronization information (elapsed time since an activation start and the number of activations in the example described above) from the agent device before data of an object is communicated. By storing common time synchronization information in both of the first communication apparatus and the second communication apparatus, data of the object can be communicated without making a response and a request of individual time synchronization information. In order to implement this, the following aspect may be adopted.

In a second aspect, there is provided a data providing system according to the first aspect, wherein the first communication apparatus further includes: a time synchronization information request sending section that sends a time synchronization information to the at least one of the second communication apparatuses; an individual time synchronization information receiving section that receives individual time synchronization information sent from the at least one of the second communication apparatuses; and a first common time synchronization information storage section that stores common time synchronization information, wherein the first data request sending section sends a data request including the received individual identification information and the received individual time synchronization information to the at least one of the second communication apparatuses, wherein the second data request sending section sends a data request including the stored common identification information and the stored common time synchronization information to the at least one of the second communication apparatuses, wherein the at least one of the second communication apparatuses further includes: an individual time synchronization information storage section that stores the individual time synchronization information; a second common time synchronization information storage section that stores the common time synchronization information; and a time synchronization information request receiving section that receives the time synchronization information request sent from the first communication apparatus, wherein the individual time synchronization information sending section sends the stored individual time synchronization information to the first communication apparatus in response to the received time synchronization information request, wherein the first data sending section sends the first type data to the first communication apparatus when the identification information included in the received data request is the stored individual identification information and the time synchronization information included in the received data request corresponds to the stored individual time synchronization information, and wherein the second data sending section sends the second type data to the first communication apparatus when the identification information included in the received data request is the stored common identification information and the time synchronization information included in the received data request is the stored common time synchronization information. Here, the term "correspond to the individual time synchronization information" described above not only means that time synchronization information included in a data request matches with individual time synchronization information stored in individual time synchronization information storage means but also means that time synchronization information included in a data request is included within a predetermined time since individual time synchronization information stored in individual time synchronization information storage means.

According to the configuration described above, the at least one of the second communication apparatuses can perform authentication of data communication by time synchronization information as well as identification information. For example, the at least one of the second communication apparatuses can send the first type data (data with a high security level) by performing authentication by both of individual identification information and individual time synchronization information. Also, the at least one of the second communication apparatus can send the second type data (data with a low security level) without making a response and a request of individual time synchronization information by using common time synchronization information in authentication. That is, the second type data can be communicated by a technique with a small communication load. Both the techniques can be implemented in a framework of a protocol (for example, SNMPv3) for sending a data request including identification information and time synchronization information.

For example, a device (device for providing data) targeted for management may be previously registered in a manager device, or the device targeted for management may be searched by conducting broadcast communication.

In a third aspect, there is provided the data providing system according to the first aspect or the second aspect, wherein the first communication apparatus further includes an identifying section, wherein the second data request sending section broadcasts a data request including the common identification information, wherein the data receiving section receives the second type data sent from the plurality of the second communication apparatuses in response to the broadcasted data request, wherein the identifying section identifies one or more of the second communication apparatuses each of which sends the second type data satisfying a predetermined condition based on the received second type data sent from the plurality of the second communication apparatuses, wherein the identification information request sending section that unicasts the identification information request to each of the identified second communication apparatuses, wherein the first data request sending section unicasts a data request including individual identification information sent from each of the identified second communication apparatuses in response to the identification information request, to each of the identified second communication apparatuses.

According to the configuration described above, the first communication apparatus can identify a device targeted for management when a data request (request of second type data) including common identification information and a response to the data request are made. A load of data communication can be reduced.

In a fourth aspect, there is provided the data providing system according to the third aspect, wherein the second type data includes data on a type of a device (for example, a printer or a router), and wherein the identifying section identifies the one or more of the second communication apparatuses each of which corresponds to a preset type (for example, a printer), based on the received second type data sent from the plurality of the second communication apparatuses. According to this configuration, the first communication apparatus can exclude a device of other type from a management target by being preset in the first communication apparatus so as to identify a device of a predetermined type.

In a fifth aspect, there is provided the data providing system according to the first aspect to the fourth aspect, wherein the first communication apparatus further includes a name storage section that stores a first name, wherein the first data request sending section sends a data request including the received individual identification information and the stored first name to the at least one of the second communication apparatuses, wherein the second data request sending section sends a data request including the stored common identification information and the stored first name to the at least one of the second communication apparatuses (in other words, the first communication apparatus sends a data request including the first name and one of the individual identification information and the common identification information, to the at least one of the second apparatuses), wherein the at least one of the second communication apparatuses further includes a name and data identifying information storage section that associates and stores each of a plurality of names with each data identifying information (here, the data identifying information is information for identify data, for example, a type of a device, a model name of the device, a vendor name, or a status), wherein the name and data identifying information storage section associates and stores the first name with first data identifying information which identifies the first type data, wherein the name and data identifying information storage section associates and stores a second name with second data identifying information which identifies the second type data, wherein the first data sending section and the second data sending section send data a type of which is identified by the stored data identifying information associated with the name included in the received data request, to the first communication apparatus, and wherein the at least one of the second apparatuses further includes a name changing section that changes the first name included in the data request to the second name when the identification information included in the received data request is the stored common identification information. That is, for example, the at least one of the second communication apparatuses may permit the first type data to be sent to the first communication apparatus when the first name is included in the data request and may send the second type data to the first communication apparatus when the second name is included in the data request. For example, the first communication apparatus sends a data request including the first name and the common identification information. In this case, the at least one of the second communication apparatuses changes the first name included in the data request into the second name. As a result of this, the at least one of the second communication apparatuses sends second type data corresponding to the second name to the first communication apparatus. According to this configuration, the at least one of the second communication apparatuses can inhibit first type data from being sent according to the data request including the common identification information. That is, the first type data with a high security level can be inhibited from being sent to the data request including the common identification information to be used for requesting data with a low security level.

In a sixth aspect, a single body of a second communication apparatus for constructing the system described above is provided as a novel device. This novel communication apparatus includes an individual identification information storage section, a first common identification information storage section, an identification information request receiving section, an individual identification information sending section, a data request receiving section, a first data sending section and a second data sending section described above. The system described above can be constructed using this communication apparatus.

While the present invention has been shown and described with reference to certain exemplary embodiments thereof, it will be understood by those skilled in the art that various changes in form and details may be made therein without departing from the spirit and scope of the invention as defined by the appended claims.

What is claimed is:

1. A data providing system comprising:
a first communication apparatus; and
a plurality of second communication apparatuses configured to provide data to the first communication apparatus using a communication protocol capable of performing authentication by identification information,
wherein the first communication apparatus includes:
a first common identification information storage unit configured to store common identification information;
a data receiving section configured to receive one or more of a first type data and a second type data;
a first type data acquiring unit configured to acquire the first type data from at least one of the plurality of second communication apparatuses, wherein the first type data acquiring unit comprises:
an individual identification request unit configured to request individual identification information from the at least one second communication apparatus;
an individual identification receiving unit configured to receive the individual identification information from the at least one second communication apparatus; and
a first data request unit that transmits the individual identification information to the at least one second communication apparatus accompanying a request for the first type data from the at least one second communication apparatus;
a second type data acquiring unit configured to acquire the second type data from at least one of the plurality of second communication apparatuses, wherein the second type data acquiring unit comprises:
a second data request unit that transmits the common identification information to the at least one second communication apparatus accompanying a request for the second type data from the at least one second communication apparatus; and
wherein the at least one second communication apparatus includes:
an individual identification information storage unit configured to store the individual identification information;
a second common identification information storage unit configured to store the common identification information;
an individual identification information request receiving unit configured to receive the individual identification information request sent from the first communication apparatus;
an individual identification information sending unit configured to send the individual identification information to the first communication apparatus after receiving the individual identification information request;
a data request receiving unit configured to receive one or more of the request for the first type data and the request for the second type data from the first communication apparatus;
a first data sending unit configured to send the first type data to the first communication apparatus when the individual identification information accompanies the request for the first type data; and
a second data sending unit configured to send the second type data to the first communication apparatus when the common identification information accompanies the request for the second type data.

2. The data providing system according to claim 1,
wherein the first communication apparatus further includes:
a time synchronization information request sending section that sends a time synchronization information request to the at least one second communication apparatus;
an individual time synchronization information receiving section that receives individual time synchronization information sent from the at least one second communication apparatus; and
a first common time synchronization information storage section that stores common time synchronization information,
wherein the first data request unit transmits a first data request including the individual identification information and the individual time synchronization information to the at least one second communication apparatus,
wherein the second data request unit transmits a second data request including the common identification information and the common time synchronization information to the at least one second communication apparatus,
wherein the at least one second communication apparatus further comprises:
an individual time synchronization information storage section that stores the individual time synchronization information;
a second common time synchronization information storage section that stores the common time synchronization information; and
a time synchronization information request receiving section that receives the time synchronization information request sent from the first communication apparatus,
wherein the individual time synchronization information sending section sends the individual time synchronization information to the first communication apparatus in response to the time synchronization information request,
wherein the first data sending unit sends the first type data to the first communication apparatus when the individual identification information accompanies the request for the first type data and the time synchronization information included in the first data request corresponds to the individual time synchronization information, and
wherein the second data sending unit sends the second type data to the first communication apparatus when the identification information accompanies the request for the second type data and the time synchronization information included in the second data request is the stored common time synchronization information.

3. The data providing system according to claim 1,
wherein the first communication apparatus further includes an identifying section,
wherein the second data request unit broadcasts a data request including the common identification information,
wherein the data receiving unit of the first communication apparatus receives the second type data from the plurality of the second communication apparatuses in response to the broadcasted data request, wherein the identifying section identifies one or more of the plurality of the second communication apparatuses each of which sends the second type data satisfying a predetermined condition based on the second type data sent by the one or more second communication apparatus, wherein the individual identification request unit unicasts the individual identification information request to each of the identified one or more second communication apparatuses, wherein the first data request unit unicasts a first data request including the individual identification information sent from each of the identified one or more second communication apparatuses to each of the identified one or more second communication apparatuses in response to the individual identification receiving unit receiving the individual identification information sent from each of the identified one or more second communication apparatuses.

4. The data providing system according to claim 3, wherein the second type data includes data on a type of a device, and wherein the identifying section identifies each of the one or more of the second communication apparatuses, each of which corresponds to a preset type, based on the received second type data sent from each of the plurality of the second communication apparatuses.

5. The data providing system according to claim 1, wherein the first communication apparatus further includes a name storage section that stores a first name, wherein the first data request unit transmits a first data request including the individual identification information and the stored first name to the at least one second communication apparatus, wherein the second data request unit transmits a second data request including the common identification information and the stored first name to the at least one second communication apparatus, wherein the at least one second communication apparatus further includes a name and data identifying information storage section that associates and stores each of a plurality of names with each data identifying information, wherein the name and data identifying information storage section associates and stores the first name with first data identifying information which identifies the first type data, wherein the name and data identifying information storage section associates and stores a second name with second data identifying information which identifies the second type data, wherein the first data sending unit and the second data sending unit send, to the first communication apparatus, a type of data identified by the stored data identifying information associated with the name included in the received data request, and wherein the at least one second apparatus further includes a name changing section that changes the first name included in the first data request to the second name when the identification information accompanying the received data request is the common identification information.

6. A communication apparatus that provides data to another communication apparatus using a communication protocol capable of performing authentication by identification information, the communication apparatus comprising:

a data request receiving section that receives a request for one or more of a first type data and a second type data sent from the other communication apparatus;

a first type data providing section, comprising:
  an individual identification information storage section that stores individual identification information;
  an individual identification information request receiving section that receives an individual identification information request from the other communication apparatus when the other communication apparatus is acquiring a first type data;
  an individual identification information sending section that sends the stored individual identification information to the other communication apparatus in response to the received identification information request; and
  a first data sending section that sends first type data to the other communication apparatus when the individual identification information accompanies the request for the first type data; and a second type data providing section, comprising:
  a common identification information storage section that stores common identification information; and
  a second data sending section that sends second type data to the other communication apparatus when the common identification information accompanies the request for the second type data.

7. The communication apparatus according to claim 6, further comprising:

an individual time synchronization information storage section that stores individual time synchronization information;

a second common time synchronization information storage section that stores common time synchronization information; and a time synchronization information request receiving section that receives a time synchronization information request sent from the other communication apparatus;

wherein the individual time synchronization information sending section sends the stored individual time synchronization information to the other communication apparatus in response to the received time synchronization information request, wherein the first data sending section sends the first type data to the other communication apparatus when the individual identification information and the time synchronization information corresponding to the stored individual time synchronization information accompany the request for the first type data, and wherein the second data sending section sends the second type data to the other communication apparatus when the common identification information and the time synchronization information corresponding to the stored common time synchronization information accompany the request for the second type data.

8. The communication apparatus according to claim 6, wherein the second data sending section sends the second type data to the other communication apparatus in response to a first data request including the common identification information, the first data request broadcasted from the other communication apparatus, and wherein the first data sending section sends the first data to the other communication apparatus in response to a second data request including individual identification information, the second data request unicasted from the other communication apparatus if the sent second type data satisfies a predetermined condition.

9. The communication apparatus according to claim 8,
wherein the second type data includes data on a type of a device, and
wherein the second data request is unicasted from the other communication apparatus if the other communication apparatus corresponds to a preset type.

10. The communication apparatus according to claim 6, further comprising:
a name and data identifying information storage section that associates and stores each of a plurality of names with each data identifying information; and
a name changing section,
wherein the name and data identifying information storage section associates and stores a first name with first data identifying information which identifies the first type data,
wherein the name and data identifying information storage section associates and stores a second name with second data identifying information which identifies the second type data,
wherein the first data sending section and the second data sending section send, to the other communication apparatus, a type of data which is identified by the stored data identifying information associated with a name included in a data request sent from the other communication apparatus, and
wherein the name changing section changes the first name included in the data request to the second name when the identification information included in the data request is the stored common identification information.

* * * * *